US012017781B2

(12) United States Patent
Kruts et al.

(10) Patent No.: US 12,017,781 B2
(45) Date of Patent: Jun. 25, 2024

(54) SYSTEMS AND METHODS FOR REGULATORS FOR INFLATION SYSTEMS FOR EVACUATION ASSEMBLIES

(71) Applicant: GOODRICH CORPORATION, Charlotte, NC (US)

(72) Inventors: Ivan Kruts, Sacramento, CA (US); Kamil Czechowski, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 1009 days.

(21) Appl. No.: 16/934,760

(22) Filed: Jul. 21, 2020

(65) Prior Publication Data

US 2022/0024598 A1    Jan. 27, 2022

(51) Int. Cl.
*B64D 25/14*    (2006.01)
*B64F 5/10*    (2017.01)
*F16K 3/32*    (2006.01)
*F16K 31/00*    (2006.01)

(52) U.S. Cl.
CPC ............... *B64D 25/14* (2013.01); *B64F 5/10* (2017.01); *F16K 3/32* (2013.01); *F16K 31/002* (2013.01)

(58) Field of Classification Search
CPC ...................................... B64D 25/14
See application file for complete search history.

(56) References Cited

U.S. PATENT DOCUMENTS

| | | | | |
|---|---|---|---|---|
| 3,762,638 | A * | 10/1973 | Goldsmith | F16K 11/02 236/12.2 |
| 4,915,106 | A * | 4/1990 | Aulgur | A62B 18/084 128/205.24 |
| 5,036,846 | A * | 8/1991 | Aulgur | A62B 18/084 128/205.24 |
| 5,088,516 | A * | 2/1992 | Fisher | G05D 16/10 236/92 R |
| 5,251,459 | A | 10/1993 | Grass et al. | |
| 5,516,042 | A | 5/1996 | Gerstengerger | |
| 5,676,309 | A | 10/1997 | Lee et al. | |
| 6,321,770 | B1 | 11/2001 | Hintzman et al. | |

(Continued)

FOREIGN PATENT DOCUMENTS

| | | | | |
|---|---|---|---|---|
| EP | 0507359 | A1 * | 10/1992 | |
| EP | 3939889 | A1 * | 1/2022 | ............. B64D 25/14 |

(Continued)

OTHER PUBLICATIONS

European Patent Office, European Search Report dated Dec. 20, 2021 in Application No. 21186469.9.

*Primary Examiner* — Jerry E Redman
(74) *Attorney, Agent, or Firm* — SNELL & WILMER L.L.P.

(57) ABSTRACT

A regulator arrangement for an inflatable includes a regulator housing comprising a bore, the bore comprising a longitudinal axis, a piston disposed in the bore and configured to translate, with respect to the regulator housing, along the longitudinal axis, an adjuster plug disposed in the bore and axially adjacent the piston, an adjuster plug stop disposed at least partially within the bore, and a spring member disposed between the adjuster plug and the piston. The adjuster plug comprises a tapered head and a shaft portion extending from the tapered head. The adjuster plug stop comprises a tapered surface configured to contact the tapered head.

14 Claims, 6 Drawing Sheets

(56) References Cited

U.S. PATENT DOCUMENTS

| | | | |
|---|---|---|---|
| 10,118,056 B2* | 11/2018 | Bruckert | A62B 25/00 |
| 10,441,826 B2* | 10/2019 | Dunn | A61M 39/223 |
| 11,299,282 B2* | 4/2022 | Haynes | B64D 25/14 |
| 11,603,939 B2* | 3/2023 | Stanton | F16K 11/0712 |
| 2010/0288281 A1* | 11/2010 | Bachelard | A62B 25/005 |
| | | | 128/206.27 |
| 2017/0203849 A1 | 7/2017 | John | |
| 2019/0135329 A1 | 5/2019 | Feldpausch et al. | |
| 2020/0018407 A1* | 1/2020 | Molfa | F16K 17/403 |
| 2023/0175608 A1* | 6/2023 | John | B64D 25/14 |
| | | | 251/181 |

FOREIGN PATENT DOCUMENTS

| | | | | |
|---|---|---|---|---|
| EP | 3943397 A1 * | 1/2022 | | B64D 25/14 |
| GB | 1060356 | 3/1967 | | |
| WO | 2015044355 | 4/2015 | | |

* cited by examiner

SYSTEMS AND METHODS FOR REGULATORS FOR INFLATION SYSTEMS FOR EVACUATION ASSEMBLIES

FIELD

The present disclosure relates to inflation systems, and more specifically to systems and methods for regulators for compressed fluid sources for evacuation assemblies.

BACKGROUND

An evacuation system may include an inflatable that helps passengers disembark from an aircraft or other vehicle in the event of an emergency or other evacuation event. Inflatable slides may deploy from a door sill or a side of the aircraft fuselage. Inflatable life rafts may be employed for water evacuations. The inflation system for the inflatable typically includes an aspirator, a pressurized cylinder, a regulator valve, and other hardware (e.g., pressure release valves, etc.).

SUMMARY

A regulator arrangement for an inflatable is disclosed, comprising a regulator housing comprising a bore, the bore comprising a longitudinal axis, a piston disposed in the bore and configured to translate, with respect to the regulator housing, along the longitudinal axis, an adjuster plug disposed in the bore and axially adjacent the piston, wherein the adjuster plug comprises a tapered head and a shaft portion extending from the tapered head, an adjuster plug stop disposed at least partially within the bore, and comprising a tapered surface configured to contact the tapered head, and a spring member disposed between the adjuster plug and the piston.

In various embodiments, the adjuster plug is configured to translate, with respect to the regulator housing, along the longitudinal axis in response to a change in temperature of the adjuster plug.

In various embodiments, an overall axial length of the spring member is configured to vary in response to the adjuster plug translating with respect to the regulator housing.

In various embodiments, the spring member at least partially surrounds the shaft portion of the adjuster plug.

In various embodiments, the adjuster plug stop surrounds at least a portion of the tapered head.

In various embodiments, a first end of the piston comprises an opening configured to receive a first end of the shaft portion of the adjuster plug.

In various embodiments, the regulator arrangement further comprises a piston support member coupled to the regulator housing and configured to receive a second end of the piston.

In various embodiments, the tapered head comprises a frustoconical geometry.

In various embodiments, the spring member comprises a Belleville washer.

An evacuation system is disclosed, comprising an inflatable and a regulator arrangement for the inflatable. The regulator arrangement comprises a regulator housing comprising a bore, the bore comprising a longitudinal axis, a piston disposed in the bore and configured to translate, with respect to the regulator housing, along the longitudinal axis, an adjuster plug disposed in the bore and axially adjacent the piston, wherein the adjuster plug comprises a tapered head and a shaft portion extending from the tapered head, an adjuster plug stop disposed at least partially within the bore, and comprising a tapered surface configured to contact the tapered head, and a spring member disposed between the adjuster plug and the piston.

In various embodiments, the adjuster plug is configured to translate, with respect to the regulator housing, along the longitudinal axis in response to a change in temperature of the adjuster plug.

In various embodiments, an overall axial length of the spring member is configured to vary in response to the adjuster plug translating with respect to the regulator housing.

In various embodiments, the spring member at least partially surrounds the shaft portion of the adjuster plug.

In various embodiments, the adjuster plug stop surrounds at least a portion of the tapered head.

In various embodiments, a first end of the piston comprises an opening configured to receive a first end of the shaft portion of the adjuster plug.

In various embodiments, the evacuation system further comprises a piston support member coupled to the regulator housing and configured to receive a second end of the piston.

A method of assembling a regulator is disclosed, comprising moving a piston into a bore of a regulator housing, the bore comprising a longitudinal axis, moving an adjuster plug into the bore and axially adjacent the piston, wherein the adjuster plug comprises a tapered head and a shaft portion extending from the tapered head, moving an adjuster plug stop into the bore, wherein the adjuster plug stop comprises a tapered surface configured to contact the tapered head, and moving a spring member into the bore and between the adjuster plug and the piston.

In various embodiments, the method further comprises moving the shaft portion of the adjuster plug to extend through at least a portion of the spring member.

In various embodiments, the method further comprises threadingly coupling the adjuster plug stop to the regulator housing, wherein the adjuster plug stop moves into the bore in response to being threadingly coupled to the regulator housing.

In various embodiments, the method further comprises coupling a piston support member to the regulator housing, wherein a second end of the piston is received by the piston support member.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
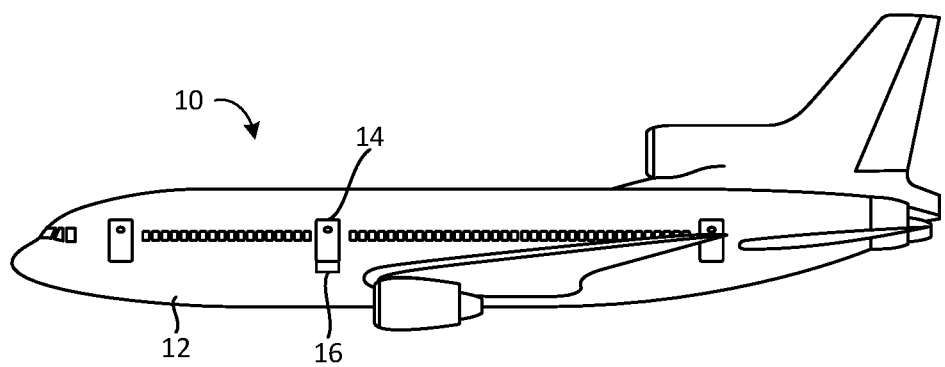
FIG. 1 illustrates an aircraft having an evacuation system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

Evacuation systems according to the present disclosure may include an inflatable (e.g., an evacuation slide or a life raft) and an inflation system configured to inflate the inflatable. The inflation systems, disclosed herein, include a regulator configured to control the output pressure of the high-pressure gas mixture to inflate the slide or inflatable. It may be desirable to have the regulator function at a wide range of operating temperatures. The regulator utilizes a spring member that adjusts a position of a piston to control the output pressure as the pressure in the cylinder decreases. During hot conditions, the spring may become weaker and thus reduce the output pressure. Conversely, during cold conditions, the spring may become stiff and thus increase the output pressure. A regulator arrangement of the present disclosure comprises an adjuster plug comprising a coefficient of linear thermal expansion tailored to allow the adjuster plug to expand and/or contract in response to hot and/or cold conditions to vary an overall length of the spring member—thereby varying a pre-load on the spring—to compensate for the thermally varying material properties of the spring member, thus maintaining a desirable output pressure.

With reference to FIG. 1, an exemplary aircraft 10 is shown, in accordance with various embodiments. Aircraft 10 may comprise a fuselage 12 having plurality of exit doors, including an exit door 14. Aircraft 10 may include one or more evacuation systems positioned near a corresponding exit door. For example, aircraft 10 includes an evacuation system 16 positioned near exit door 14. In the event of an emergency, exit door 14 may be opened by a passenger or crew member of aircraft 10. In various embodiments, evacuation system 16 may deploy in response to exit door 14 being opened or in response to another action taken by a passenger or crew member such as depression of a button or actuation of a lever.

Figure 2:
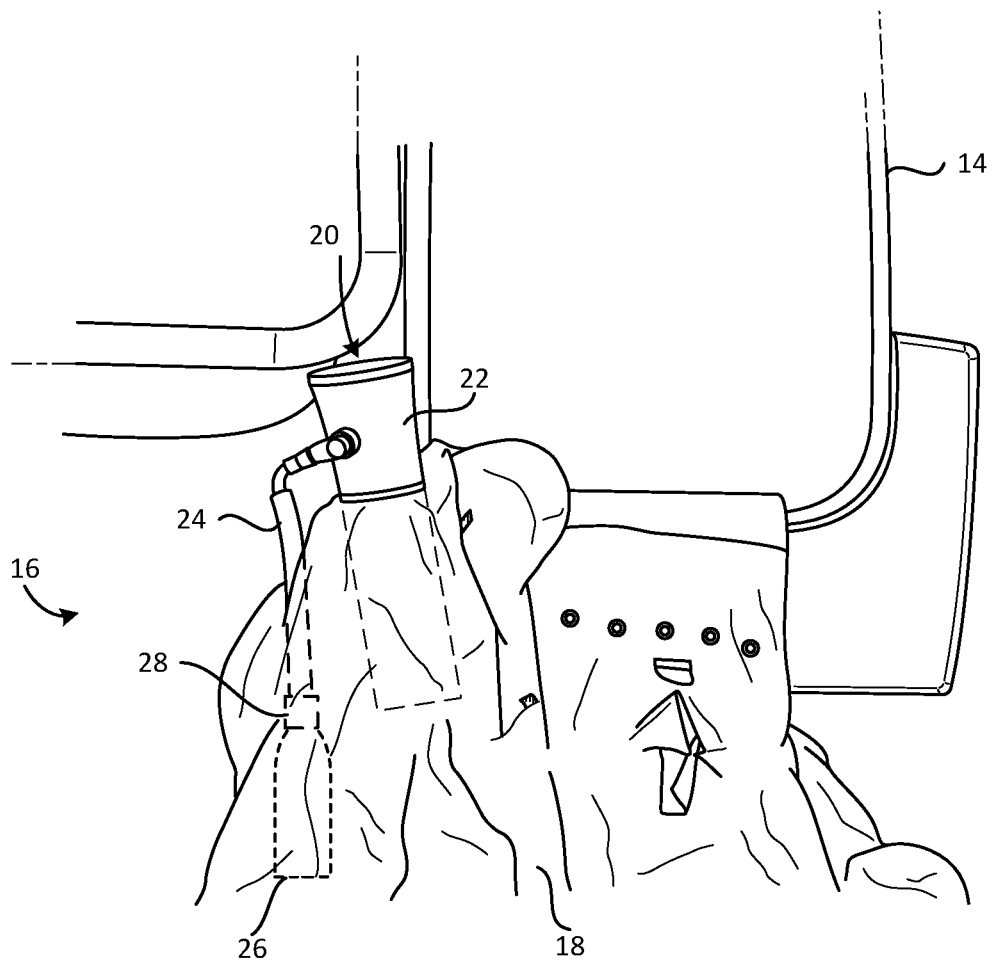
FIG. 2 illustrates an evacuation system, in accordance with various embodiments.

Referring to FIGS. 1 and 2, additional details of evacuation system 16 are illustrated, in accordance with various embodiments. In particular, evacuation system 16 includes an inflatable evacuation device 18. Evacuation system 16 further includes a source of forced gas 20. The source of forced gas 20 may cause a gas to enter the inflatable evacuation device 18 to inflate the inflatable evacuation device 18. The inflatable evacuation device 18 may be coupled to the fuselage 12 of FIG. 1, and may be decoupled from fuselage 12 in response to being fully inflated or manually detached to allow passengers and/or crew members to safely float away from aircraft 10 of FIG. 1.

In various embodiments, the source of forced gas 20 may include an aspirator 22 coupled to the inflatable evacuation device 18, piping 24 coupled to the aspirator 22, and a compressed fluid source 26 coupled to the piping 24. During normal flight conditions, the inflatable evacuation device 18 may be deflated and stored within a compartment of aircraft 10. In various embodiments, inflatable evacuation device 18 and aspirator 22 may be stored in a single package within the aircraft compartment. In response to deployment of the evacuation system 16, fluid may flow into aspirator 22 via piping 24 at a relatively high velocity. This fluid flow may cause aspirator 22 to draw gas from the environment. The fluid flow (such as in a gaseous state) and the environmental gas may be directed into the inflatable evacuation device 18. In response to receiving the fluid flow and the environmental gas, inflatable evacuation device 18 may begin to inflate. A regulator 28 may be coupled in fluid communication between the compressed fluid source 26 and the aspirator 22 to regulate a flow of the compressed fluid.

Figure 3A:
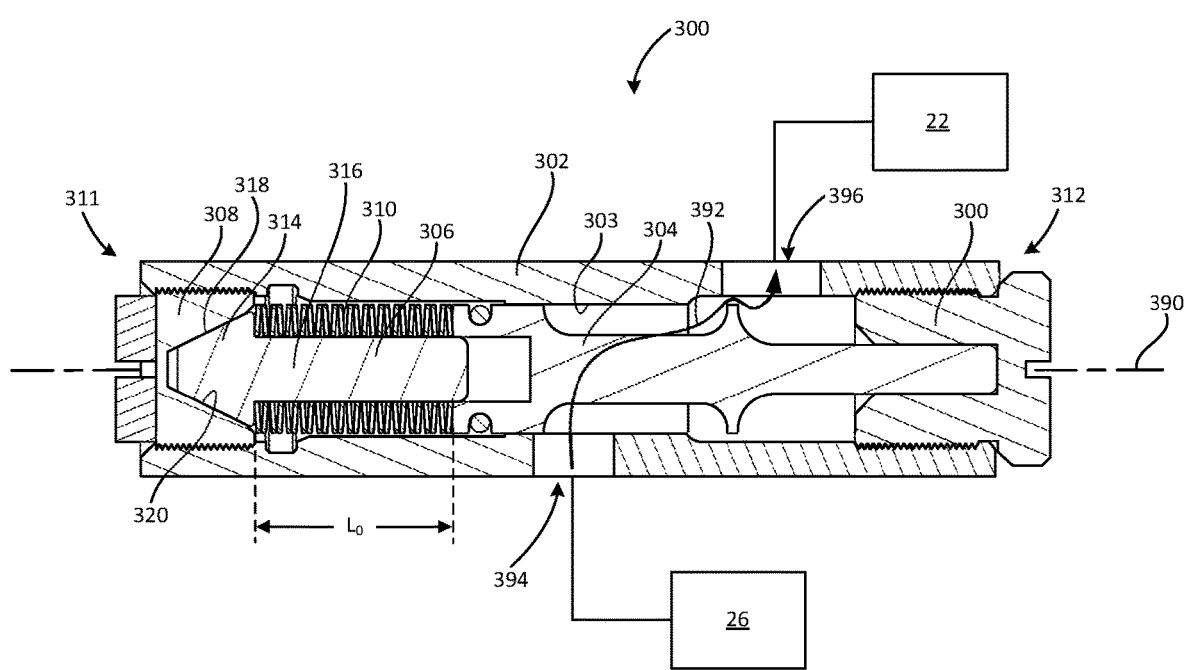
FIG. 3A illustrates a regulator for an evacuation system, the regulator comprising an adjuster plug assembly at ambient temperature conditions, in accordance with various embodiments.

With reference to FIG. 3A, a regulator arrangement 300 is illustrated, in accordance with various embodiments. Regulator arrangement 300 may be similar to regulator 28 of FIG. 2, in accordance with various embodiments. Regulator arrangement 300 may be in fluid communication with compressed fluid source 26. Regulator arrangement 300 may be in fluid communication with aspirator 22. Regulator arrangement 300 may regulate a flow of compressed fluid, illustrated by arrow 392, from the compressed fluid source 26 to the aspirator 22.

Regulator arrangement 300 generally comprises a regulator housing 302, a piston 304, an adjuster plug 306, an adjuster plug stop 308, and a spring member 310. Regulator housing 302 may comprise a first end 311 and a second end 312. Regulator housing 302 may comprise a bore extending through regulator housing 302 and comprising a longitudinal axis 390. Regulator housing 302 may comprise an inlet 394 and an outlet 396. Compressed fluid may be received at inlet 394 from compressed fluid source 26 and may exit at outlet 396. The pressure of the flow of compressed fluid 392 may be regulated based upon the position of piston 304 within bore 303, with respect to regulator housing 302. Spring member 310 may urge piston 304 towards the second end of regulator housing 302. Spring member 310 may be compressed between adjuster plug 306 and piston 304.

Adjuster plug 306 may comprise a head portion 314 (also referred to herein as a tapered head) and a shaft portion 316 extending from the head portion 314. Head portion 314 may be tapered. Stated differently, head portion 314 may comprise a tapered surface 318. Adjuster plug stop 308 may comprise a tapered surface 320 that is complementary to the tapered surface 318 of head portion 314. Head portion 314 may be received by adjuster plug stop 308. Stated differently, head adjuster plug stop 308 may at least partially surround head portion 314. Tapered surface 318 may be configured to contact tapered surface 320. Adjuster plug 306 may be configured to expand and/or contract with varying temperatures to compress or extend spring member 310. In this manner, adjuster plug 306 may accommodate material property changes of spring member 310 as a result of the varying temperature. For example, a spring constant (k) of spring member 310 may decrease in response to spring member 310 increasing in temperature. Conversely, the spring constant (k) of spring member 310 may increase in response to spring member 310 decreasing in temperature. Therefore, the position of the adjuster plug 306 varies in response to a change in temperature to maintain a desired pre-load on the spring member 310, thereby maintaining a desired output pressure of the inflation system during deployment of the inflatable.

In various embodiments, adjuster plug 306 is made from a material comprising a relatively high coefficient of linear thermal expansion, such as aluminum, an aluminum alloy, copper, a copper alloy, or the like. As used herein, the term "relatively high coefficient of linear thermal expansion" may mean a material with a coefficient of linear thermal expansion that is greater than that of the material of adjuster plug stop 308. In various embodiments, the coefficient of linear thermal expansion of adjuster plug 306 may be greater than $9 \times 10^{-6}$ in/(in ° F.) ($16.2 \times 10^{-6}$ m/(m ° C.)). In various embodiments, the coefficient of linear thermal expansion of adjuster plug 306 may be between $9 \times 10^{-6}$ in/(in ° F.) and $20 \times 10^{-6}$ in/(in ° F.) (between $16.2 \times 10^{-6}$ and $36 \times 10^{-6}$ m/(m ° C.)).

With reference to FIG. 3A, regulator arrangement 300 is illustrated in ambient temperature conditions. A gap $L_0$ may exist between head portion 314 and piston 304 under ambient temperature conditions. In various embodiments, gap $L_0$ may be substantially equal to the overall axial length of spring member 310. In this regard, spring member 310 may be disposed within the gap $L_0$.

Figure 3B:
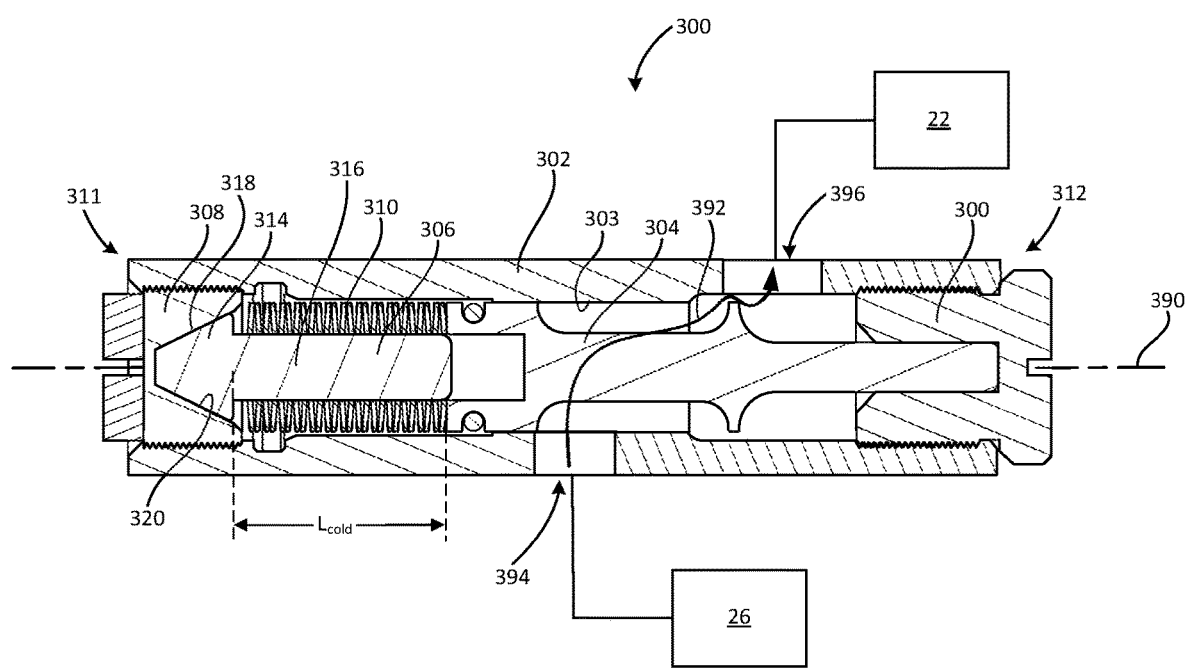
FIG. 3B illustrates the regulator of FIG. 3A at cold temperature conditions, in accordance with various embodiments.

With reference to FIG. 3B, regulator arrangement 300 is illustrated in cold temperature conditions. A gap $L_{cold}$ may exist between head portion 314 and piston 304 under cold temperature conditions. In this regard, spring member 310 may be disposed within the gap $L_{cold}$. Stated differently, spring member 310 may be allowed to expand under cold temperature conditions to accommodate for the stiff material properties of spring member 310 under cold temperature conditions. Under cold temperature conditions, adjuster plug 306 may shrink, wherein spring member 310 urges adjuster plug 306 to translate within bore 303, with respect to regulator housing 302 and adjuster plug stop 308, to be received further into adjuster plug stop 308, thereby allowing spring member 310 to axially expand, and decreasing pre-load on spring member 310.

Figure 3C:
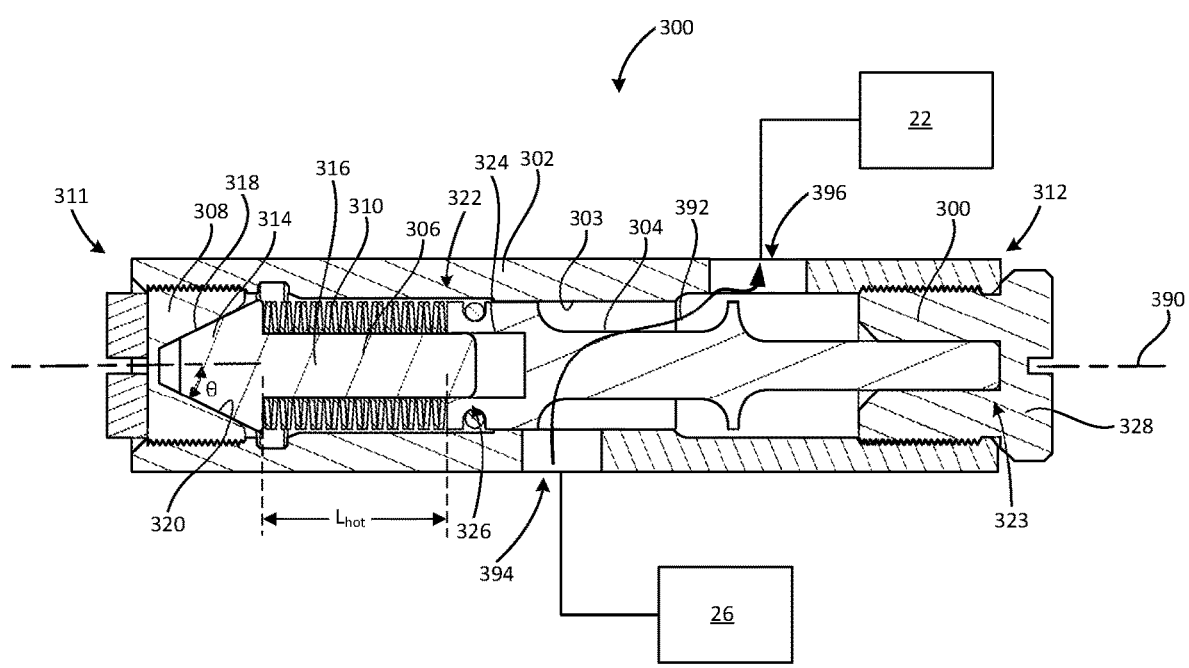
FIG. 3C illustrates the regulator of FIG. 3A at hot temperature conditions, in accordance with various embodiments.

With reference to FIG. 3C, regulator arrangement 300 is illustrated in hot temperature conditions. A gap $L_{hot}$ may exist between head portion 314 and piston 304 under hot temperature conditions. In this regard, spring member 310 may be disposed within the gap $L_{hot}$. Stated differently, spring member 310 may be compressed between head portion 314 and piston 304 under hot temperature conditions to accommodate for the weaker material properties of spring member 310 under hot temperature conditions. Under hot temperature conditions, adjuster plug 306 may grow, wherein adjuster plug stop 308 urges adjuster plug 306 to translate within bore 303 away from the adjuster plug stop 308 with respect to regulator housing 302, against the bias of spring member 310, thereby compressing spring member 310, and adding pre-load on spring member 310.

In various embodiments, the head portion 314 is wedge-shaped. In various embodiments, the head portion 314 comprises a frustoconical geometry. The tapered geometry of head portion 314 and adjuster plug stop 308 aids in translating adjuster plug 306 within bore 303 in response to the change in temperature. In this manner, the angle θ of tapered surface 318 and/or tapered surface 320 with respect to longitudinal axis 390 may be tailored to move adjuster plug 306 varying linear distance per degree change in temperature. Angle θ may be tailored based upon the coefficient of linear thermal expansion of adjuster plug 306. In various embodiments, angle θ is between twenty and seventy degrees (20°-70°). In various embodiments, angle θ is between thirty degrees and sixty degrees (30°-60°). In various embodiments, angle θ is between forty degrees and fifty degrees (40°-50°). In various embodiments, angle θ is between thirty degrees and forty-five degrees (30°-45°).

In various embodiments, piston 304 is configured translate, with respect to the regulator housing 302, along the longitudinal axis 390. Piston 304 may be made from a metal or metal alloy, such as steel, stainless steel, or the like. In various embodiments, adjuster plug 306 may be disposed in the bore 303 axially adjacent piston 304. In various embodiments, a first end 322 of the piston 304 may comprise an opening 324 configured to receive a first end 326 of the shaft portion 316 of the adjuster plug 306.

Adjuster plug stop 308 may be threadingly coupled to regulator housing 302. In this regard, adjuster plug stop 308 may comprise a threaded rod. In this regard, adjuster plug stop 308 may move further into, or out of, bore 303 in response to being rotated with respect to regulator housing 302. In various embodiments, the tapered surface 320 is coaxial with longitudinal axis 390.

Spring member 310 may comprise a coil spring, a plurality of Belleville washers, or the like. Spring member 310 may be made from a metal or metal alloy, such as spring steel, stainless steel, austenitic stainless steels, ferritic stainless steels, martensitic stainless steels, titanium, titanium alloys, aluminum, aluminum alloys, galvanized steel, or any other suitable metal or metal alloy. Shaft portion 316 of adjuster plug 306 may extend through spring member 310.

In various embodiments, the regulator arrangement 300 further comprises a piston support member 328 coupled to the regulator housing 302. Piston support member 328 may be configured to receive a second end 323 of the piston 304.

Figure 4:
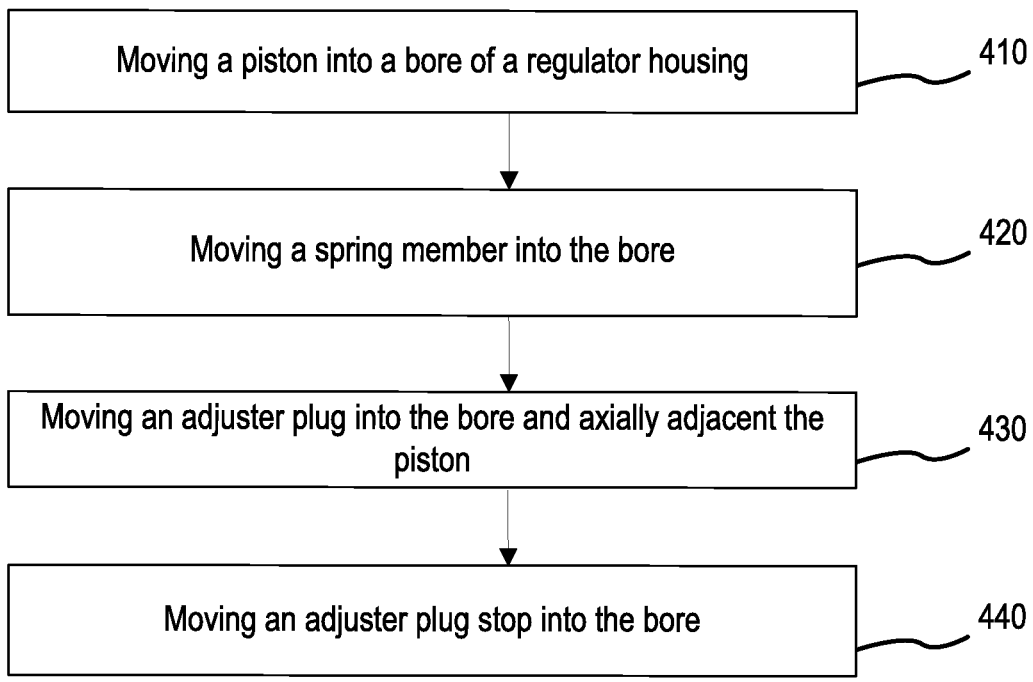
FIG. 4 illustrates a flow chart for a method for assembling a regulator for a compressed fluid source, in accordance with various embodiments.

With reference to FIG. 4, a flow chart for a method 400 of assembling a regulator is illustrated, in accordance with various embodiments. Method 400 includes moving a piston into a bore of a regulator housing (step 410). Method 400 includes moving a spring member into the bore (step 420). Method 400 includes moving an adjuster plug into the bore and axially adjacent the piston (step 430). Method 400 includes moving an adjuster plug stop into the bore (step 440).

With combined reference to FIG. 3A and FIG. 4, step 410 may include moving piston 304 into bore 303 of regulator housing 302. Step 420 may include moving spring member 310 into bore 303. In various embodiments, step 420 includes moving a coil spring into bore 303. In various embodiments, step 420 includes stacking a plurality of Belleville washers in bore 303. Step 430 may include moving adjuster plug 306 into bore 303 and axially adjacent the piston 304. In various embodiments, step 430 includes disposing the shaft portion 316 of adjuster plug 306 at least partially through spring member 310. Step 440 may include moving adjuster plug stop 308 into bore 303.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A regulator arrangement for an inflatable, comprising:
   a regulator housing comprising a bore, the bore comprising a longitudinal axis;
   a piston disposed in the bore and configured to translate, with respect to the regulator housing, along the longitudinal axis;
   an adjuster plug disposed in the bore and axially adjacent the piston, wherein the adjuster plug comprises a tapered head and a shaft portion extending from the tapered head, and the adjuster plug is configured to translate, with respect to the regulator housing, along the longitudinal axis in response to a change in temperature of the adjuster plug;
   an adjuster plug stop disposed at least partially within the bore, and comprising a tapered surface configured to contact the tapered head; and
   a spring member disposed between the adjuster plug and the piston.

2. The regulator arrangement of claim 1, wherein an overall axial length of the spring member is configured to vary in response to the adjuster plug translating with respect to the regulator housing.

3. The regulator arrangement of claim 2, wherein the spring member at least partially surrounds the shaft portion of the adjuster plug.

4. The regulator arrangement of claim 2, wherein the adjuster plug stop surrounds at least a portion of the tapered head.

5. The regulator arrangement of claim 4, wherein the tapered head comprises a frustoconical geometry.

6. The regulator arrangement of claim 2, wherein a first end of the piston comprises an opening configured to receive a first end of the shaft portion of the adjuster plug.

7. The regulator arrangement of claim 6, further comprising a piston support member coupled to the regulator housing and configured to receive a second end of the piston.

8. The regulator arrangement of claim 2, wherein the spring member comprises a Belleville washer.

9. An evacuation system, comprising:
an inflatable; and
a regulator arrangement for the inflatable, comprising:
- a regulator housing comprising a bore, the bore comprising a longitudinal axis;
- a piston disposed in the bore and configured to translate, with respect to the regulator housing, along the longitudinal axis;
- an adjuster plug disposed in the bore and axially adjacent the piston, wherein the adjuster plug comprises a tapered head and a shaft portion extending from the tapered head, and the adjuster plug is configured to translate, with respect to the regulator housing, along the longitudinal axis in response to a change in temperature of the adjuster plug;
- an adjuster plug stop disposed at least partially within the bore, and comprising a tapered surface configured to contact the tapered head; and
- a spring member disposed between the adjuster plug and the piston.

10. The evacuation system of claim 9, wherein an overall axial length of the spring member is configured to vary in response to the adjuster plug translating with respect to the regulator housing.

11. The evacuation system of claim 10, wherein the spring member at least partially surrounds the shaft portion of the adjuster plug.

12. The evacuation system of claim 10, wherein the adjuster plug stop surrounds at least a portion of the tapered head.

13. The evacuation system of claim 10, wherein a first end of the piston comprises an opening configured to receive a first end of the shaft portion of the adjuster plug.

14. The evacuation system of claim 13, further comprising a piston support member coupled to the regulator housing and configured to receive a second end of the piston.

* * * * *